United States Patent [19]

Pfluger

[11] 4,429,922
[45] Feb. 7, 1984

[54] ANTIFRICTION AXIAL GUIDE MEANS

[75] Inventor: Walter Pfluger, Solothurn, Switzerland

[73] Assignee: Agathon A.G. Maschinenfabrik, Solothurn, Switzerland

[21] Appl. No.: 283,647

[22] Filed: Jul. 15, 1981

[30] Foreign Application Priority Data

Jul. 17, 1980 [CH] Switzerland .......... 5492/80

[51] Int. Cl.³ .......... F16C 29/04
[52] U.S. Cl. .......... 308/6 R; 308/215
[58] Field of Search .......... 308/6 R, 6 A, 6 B, 6 C, 308/3 A, 7, 215

[56] References Cited

U.S. PATENT DOCUMENTS

| 1,918,677 | 7/1933 | Wingquist | 308/214 |
| 2,889,180 | 6/1959 | Jorgensen | 308/217 X |
| 2,981,568 | 4/1961 | Wise | 308/217 X |
| 3,090,657 | 5/1963 | Diebold | 308/217 |
| 3,099,168 | 7/1963 | Martens | 308/217 X |
| 3,210,135 | 10/1965 | Goller | 308/6 B |
| 3,281,189 | 10/1966 | Danneman | 308/6 B |
| 3,341,262 | 9/1967 | Kalmanek | 308/6 R |

FOREIGN PATENT DOCUMENTS 476226  9/1969  Switzerland .
181156  6/1922  United Kingdom .

Primary Examiner—Stuart S. Levy
Assistant Examiner—David J. Werner
Attorney, Agent, or Firm—Pearne, Gordon, Sessions, McCoy, Granger & Tilberry

[57] ABSTRACT

Roller-shaped elements are disposed between races formed on the parts to be guided relative to one another. Each of these rolling elements has two spaced, spherical-segment-shaped bearing surfaces which are in substantially point-wise contact with the races. This design makes it possible to accommodate more rolling elements circumferentially as compared with constructions utilizing balls as the rolling elements, thus increasing the bearing capacity and rigidity of the guide means while maintaining low-friction rolling conditions.

1 Claim, 1 Drawing Figure

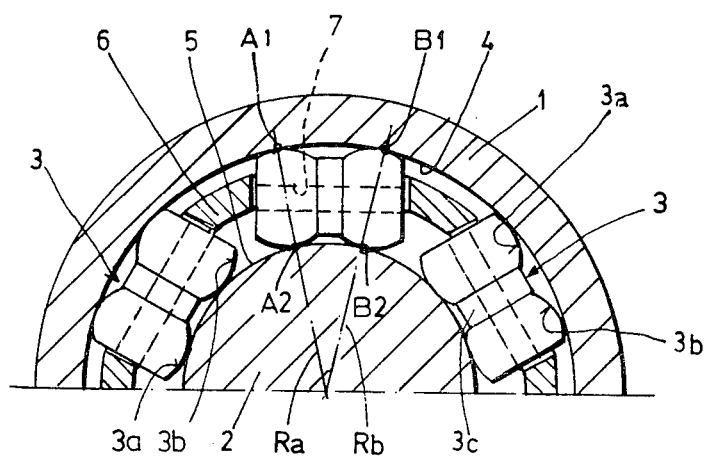

ANTIFRICTION AXIAL GUIDE MEANS

This invention relates to axial or longitudinal guide means utilizing anifriction bearings, and more particularly to such means of the type in which roller-shaped elements are disposed between and in engagement with races, one or more of the races being formed on a guiding part and one or more other races being formed on a guided part, each rolling element having two spaced, spherical-segment-shaped bearing surfaces of equal diameter which are each in substantially point-wise contact with the race or races formed on one of the aforementioned parts.

In axial guide means disclosed in Swiss Pat. No. 476,226, each rolling element has a middle bearing surface in linear contact with the convex inner race and two adjacent bearing surfaces in linear contact with the concave outer race. The purpose of this design was to lessen the Hertzian compression by improving the hug between the roller bearing surfaces and the races. The carrying capacity and rigidity of the guide design were also supposed to be increased thereby as compared with a guide means utilizing balls as the rolling elements.

A disadvantage of this proposal, however, is that at the three linear contact locations of each rolling element, the magnitude of the rolling radii varies over the length of each of these contact locations. Thus, a true rolling movement can take place at only one point of each of these contact locations; as the distance from this point increases toward one side and the other, the "slip" also increases. Inevitably, therefore, friction phenomena occur which are comparable to the friction between the flanks of the teeth in certain types of gearing. These friction phenomena have been proven to result in increased wear and tear and also in the generation of frictional heat, all the more so as, for well-known reasons, all roll guides actually reduced to practice are designed so that bias occurs.

Axial guide means of the type initially mentioned are described in U.S. Pat. No. 3,210,135. This patent discloses longitudinal guiding means in which the guiding and guided parts are square in cross-section, with rows of rolling elements disposed at two diagonally opposite corners. Each rolling element is a ball having an equatorial groove, the sides of which are inclined at an angle of 45° to the equatorial plane. Although the two spherical bearing surfaces are in point-wise contact with the two outer-part races meeting at a corner, the two bearing surfaces formed by the sides of the groove are not in point-wise contact, but rather in linear contact, with the two inner-part surfaces (races) likewise meeting at a corner.

Hence this prior art design has the drawback that the aforementioned friction phenomena, associated with the generation of frictional heat and with wear and tear, necessarily occur between the bearing surfaces formed by the sides of the groove and the matching races on the inner part.

It is an object of the present invention to provide improved antifriction axial guide means which remedy this situation.

To this end, in the antifriction axial guide means according to this invention, of the type initially mentioned, the same two bearing surfaces are also each in substantially point-wise contact with an associated race formed on the other of the mentioned parts, the rolling conditions being the same for both bearing surfaces.

The main advantage of such a construction, as compared with the two prior art designs, is that similarly to conventional designs using balls as the rolling elements, a pure rolling movement again becomes possible, so that wear and tear and frictional heat do not occur. As compared with such a conventional design, it has the advantage that—with the same diameters—considerably more pairs of contact locations can be accommodated on the circumference because, in a cage, there must necessarily be a sufficiently large spacing between the openings in which rolling elements are lodged. In the design according to the present invention, there exist, as it were, only those ball-portions which perform a bearing function. The bearing capacity or rigidity is increased for this reason alone, but it is further increased by the elimination of the rotary degree of freedom between the guiding and guided parts.

As regards the number of contact locations which can be accommodated, i.e., the number of rows of rolling elements, which is decisive for the bearing capacity or ridigity, it should be noted that in the design proposed in U.S. Pat. No. 3,210,135, only two rows of rolling elements are provided, and at most two more rows could be provided at the other two corners.

There are still other advantages associated with the present invention as compared with the prior art design having roller-shaped elements, viz., greater tolerances are permissible as regards from defects; checking of the rolling elements is facilitated; and rolling elements of a given size can be used in designs having races of differing diameters (only the difference between these diameters must fit the diameter of the spherical-segment-shaped bearing surfaces of the rolling elements, taking the desired bias into account).

Each rolling element may have a continuous center bore for increasing the elasticity of the element. This may be desirable under certain circumstances, e.g., under certain bias conditions.

A preferred embodiment of the invention will now be described in detail with reference to the accompanying drawing, which is a partial sectional view of the guide means.

Of parts 1 and 2, one is the guiding part and the other the guided part. Roller-shaped elements 3 are disposed between coaxial, cylindrical races 4 and 5 formed on parts 1 and 2, respectively, and rotatably held in a cage 6; the details of the cage construction are of no significance in the present context.

Each rolling element 3 has two spaced, spherical-segment-shaped bearing surfaces 3a and 3b, both of which are in substantially point-wise contact with races 4 and 5. The two points of contact on bearing surface 3a are designated A1 and A2 and are situated on a radius Ra; the two points of contact on bearing surface 3b are designated B1 and B2 and are situated on a radius Rb. The portion 3c between bearing surfaces 3a and 3b is cylindrical in the embodiment illustrated; however, its outer surface might have a different, e.g., concavely curved, form. All that is important is that the outer surface of portion 3c must not come in contact with inner race 5.

In the embodiment shown in the drawing, each rolling element 3 has a continuous central longitudinal bore 7 for increasing the elasticity of the element.

It will be understood that, although not shown in the drawing, two rolling elements staggered in the longitudinal direction of the guide means might be disposed next to each rolling element, as in the case of known designs.

As regards the layout of the guide surfaces in the cross-section of the axial guide means, numerous and varied modified embodiments are conceivable, just a few of which may be mentioned as follows:

per row of rolling elements, two guide surface sections—plane, but inclined toward one another in cross-section—or one such plane section, might be situated opposite a convex cylindrical guide surface (such as race 5), the number and distribution of rows of rolling elements being freely selectable (as an extreme case, there could be only one row of rolling elements);

per row of rolling elements (here again, there might be only one such row), two guide surface sections on the one part—likewise plane, but inclined toward one another in cross-section—might be situated opposite such sections on the other part, in which case oppositely disposed surface sections might be parallel or inclined toward one another.

In every case, however, care must be taken, by preserving the symmetry of the guide surfaces or surface sections relative to the symmetry plane of the rows, or of each row, of rolling elements, that the conditions are identical for the two bearing surfaces of each rolling element so that rolling without concurrent sliding is ensured.

What is claimed is:

1. An assembly adapted for relative linear movement comprising a guiding part and a guided part movable only linearly relative to one another, said guiding part having at least one first race disposed thereon and said guided part having at least one second race disposed thereon, a plurality of roller-shaped elements each defining an axis of roll in a plane perpendicular to the direction of relative linear movement between said guiding and guided parts, and disposed between said guiding and guided parts, each of said roller-shaped elements comprising two spaced, spherical-segment-shaped bearing surfaces of equal diameter with their centers spaced from one another along said axis of roll and rigidly connected to one another, said two bearing surfaces respectively contacting said first and said second races at substantially a single point each for ensuring substantially identical rolling conditions of both said bearing surfaces relative to both said first and second races as said guided and guiding parts move in a linear direction relative to one another.

* * * * *